(12) United States Patent
Coolens et al.

(10) Patent No.: US 10,041,386 B2
(45) Date of Patent: Aug. 7, 2018

(54) OIL SEPARATOR UNIT

(75) Inventors: Holger Coolens, Filderstadt (DE);
Matthias Herzel, Trochtelfingen (DE);
Klaus Bendl, Oberderdingen (DE);
Gabriele Gorbach, Reutlingen (DE);
Erich Amann, Rottenburg (DE); Gerd Reichle, Dettingen (DE); Tobias Michael Gruhler, Pfullingen (DE)

(73) Assignee: ElringKlinger AG, Dettingen (DE)

( * ) Notice: Subject to any disclaimer, the term of this patent is extended or adjusted under 35 U.S.C. 154(b) by 587 days.

(21) Appl. No.: 13/307,607

(22) Filed: Nov. 30, 2011

(65) Prior Publication Data
US 2012/0138171 A1 Jun. 7, 2012

(30) Foreign Application Priority Data

Dec. 2, 2010 (DE) .................. 10 2010 062 321

(51) Int. Cl.
*F01M 13/04* (2006.01)
*F16K 15/14* (2006.01)
*F16K 27/02* (2006.01)

(52) U.S. Cl.
CPC .......... *F01M 13/04* (2013.01); *F16K 15/148* (2013.01); *F16K 27/0209* (2013.01); *F01M 2013/0433* (2013.01); *F01M 2013/0438* (2013.01); *F01M 2013/0494* (2013.01); *Y10T 137/7837* (2015.04)

(58) Field of Classification Search
CPC .... F16K 27/0209; F16K 15/14; F16K 15/148; F01M 13/023; F01M 13/04; F01M 2013/0494; F01M 2013/0433; F01M 2013/0438

USPC .............. 137/516.11, 516.13, 843, 852, 854; 123/41.86, 572
See application file for complete search history.

(56) References Cited

U.S. PATENT DOCUMENTS

| | | | | |
|---|---|---|---|---|
| 3,403,696 A | * | 10/1968 | Pynchon ................. | 137/516.13 |
| 4,580,543 A | | 4/1986 | Aoki | |
| 4,602,595 A | | 7/1986 | Aoki et al. | |
| 5,067,449 A | | 11/1991 | Bonde | |
| 5,507,318 A | * | 4/1996 | Israelson ....................... | 137/854 |
| 5,881,686 A | * | 3/1999 | Schmidt ..................... | 123/41.86 |
| 6,161,529 A | * | 12/2000 | Burgess ....................... | 123/572 |

(Continued)

FOREIGN PATENT DOCUMENTS

| DE | 1978048 U | * | 2/1968 |
|---|---|---|---|
| DE | 9319172 U1 | | 2/1994 |

(Continued)

*Primary Examiner* — Jessica Cahill
(74) *Attorney, Agent, or Firm* — Reinhart Boerner Van Deuren P.C.

(57) ABSTRACT

In order to improve an oil separator unit, in particular an oil separator unit provided for vehicle drives, comprising an oil separator housing with a drainage system and a check valve unit which is formed from a valve seat and a valve element which comprises a valve member of an umbrella-like design and consisting of an elastomer, in such a manner that it can be produced as inexpensively as possible, on the one hand, and, on the other hand, the wear on the valve element is, however, considerably reduced or occurs to as low a degree as possible, it is suggested that the valve member of the valve element be held on an insert part and that the insert part be insertable, for its part, into an insert part receptacle in a valve housing.

37 Claims, 8 Drawing Sheets

(56) References Cited

U.S. PATENT DOCUMENTS

| | | | |
|---|---|---|---|
| 6,648,004 B2* | 11/2003 | Lau | 137/223 |
| 7,631,639 B2* | 12/2009 | Yonebayashi et al. | 123/572 |
| 2001/0054418 A1* | 12/2001 | Burgess | 123/572 |
| 2008/0142102 A1* | 6/2008 | Savard | 137/854 |
| 2009/0126708 A1 | 5/2009 | Jang | |

FOREIGN PATENT DOCUMENTS

| | | |
|---|---|---|
| DE | 10 2006 025 814 A1 | 12/2007 |
| DE | 102006041213 A1 | 3/2008 |
| DE | 10 2010 027 783 A1 | 10/2011 |
| EP | 1067276 A1 | 1/2001 |
| GB | 1195470 | 6/1970 |
| JP | 07259530 A | 10/1995 |
| NL | 1032942 C2 | 12/2007 |

* cited by examiner

OIL SEPARATOR UNIT

CROSS-REFERENCE TO RELATED PATENT APPLICATIONS

The present disclosure relates to the subject matter disclosed in German application number 10 2010 062 321.0 of Dec. 2, 2010, which is incorporated herein by reference in its entirety and for all purposes.

BACKGROUND OF THE INVENTION

The invention relates to an oil separator unit, in particular an oil separator unit provided for vehicle drives, comprising an oil separator housing with a drainage system and a check valve unit which is formed from a valve seat and a valve element which comprises a valve member of an umbrella-like design and consisting of an elastomer.

Oil separator units of this type are preferably arranged on or in crankcases, on or in the oil sump housing, on or in cylinder heads or camshaft chamber covers of combustion engines, in particular in crankcases or camshaft chamber venting systems of combustion engines.

The problem with such oil separator units with a check valve is that the valve element is subject to wear on account of the pressure pulsations and vibrations occurring in the engine and the friction resulting therefrom, wherein the wear manifests itself to the extent that the valve element tears or even to the extent that part of the valve element becomes detached.

Wear problems of this type lead to an impairment of the operability or to the fact that the resources required during production to fix the valve element in place on the check valve unit are high.

The object underlying the invention is, therefore, to improve an oil separator unit of the generic type in such a manner that it can be produced as inexpensively as possible, on the one hand, and, on the other hand, the wear on the valve element is, however, considerably reduced or occurs to as low a degree as possible.

SUMMARY OF THE INVENTION

This object is accomplished in accordance with the invention, in an oil separator unit of the type described at the outset, in that the valve member of the valve element is held on an insert part and that the insert part can, for its part, be inserted into an insert part receptacle in a valve housing.

The advantage of the solution according to the invention is to be seen in the fact that, as a result, it is possible to produce the insert part as a separate part and design it with its surfaces holding the valve element in such a manner that wear on the valve element, in particular in the region of the surfaces holding it, is considerably diminished and, where possible, can be reduced to a negligible degree.

It is, in addition, particularly advantageous when, due to the fact that the valve element is held on the insert part, the valve element and the insert part can be preassembled and, therefore, the insert part can be inserted into the valve housing with the preassembled valve element, which likewise makes the handling of the valve element and the assembly thereof in the valve housing considerably easier.

With respect to the design of the insert part receptacle, it would be conceivable, for example, to also design this as a separate part which can be assembled on the valve housing.

The insert part can be designed in several parts, particularly when the installation is simplified as a result.

One favorable solution provides, however, for the insert part receptacle to be integrally formed on the valve housing in one piece so that the advantage of the simple production of the insert part receptacle in one piece with the valve housing can be exploited since the connection between the insert part receptacle and the insert part does not have the problems which result when fixing in place the holding attachment of the valve element which is formed from an elastomer.

The insert part can also, for example, be designed in several pieces, for example in order to make its production easier.

A solution which is particularly advantageous for reasons of cost provides, however, for the insert part to be designed as a one-piece part.

With respect to the fixing of the insert part in the insert part receptacle, the most varied of possibilities are conceivable.

In principle, it is conceivable to fix the insert part in the insert part receptacle in a force locking manner, for example by means of a thread, wherein an exclusively force locking fixing in position can be a problem with respect to the continuous durability.

For this reason, one particularly favorable solution provides for the insert part to be held in the insert part receptacle in a form locking manner.

Such a form locking fixing could be brought about, for example, via a bayonet connection.

A particularly simple solution provides, however, for the insert part to be lockable in the insert part receptacle.

Another, advantageous possibility for fixing the insert part in place in the insert part receptacle provides for the insert part to be fixed in the insert part receptacle in a materially locking manner.

Such a materially locking fixing of the insert part in the insert part receptacle may be realized, for example, by gluing the insert part to the insert part receptacle.

Another, advantageous solution may be realized by welding the insert part to the insert part receptacle.

In order to ensure that the oil does not collect in the region of the insert part, it is preferably provided for the insert part to have at least one opening for oil.

The design of the valve element can be brought about in the most varied of ways.

For example, the valve element can be designed such that it comprises only the valve member.

In this case, one advantageous solution provides for the valve member to be held directly on the insert part.

Another possibility provides for the valve member to be connected to the insert part so as to be movable.

For example, this can be realized in that the valve member is guided for movement on the insert part, either on its circumferential side or through a central opening.

One particularly favorable solution in the case of a movable connection between the valve member and the insert part provides for the valve member to be provided with a holding attachment of the valve element.

In this respect, the holding attachment is preferably integrally formed on the valve member in one piece.

In this respect, the holding attachment can be arranged so as to be located radially outwards or be connected to the valve member as a central attachment.

In principle, it would be possible with the solution according to the invention, on account of the elastic configuration of the valve member, to realize the opening and closing of the check valve unit by way of elastic deformation so that the valve member lifts away from the valve seat or rests on the valve seat on account of its elastic deformation.

This would, however, result in the check valve only opening when the oil collecting above the check valve exerts an adequate hydrostatic pressure on account of a relatively large oil column.

For this reason, it is preferably provided for the valve member to be movable as a whole relative to the valve seat between a closed position and an open position.

This means that the entire valve member can be moved relative to the valve seat in order to transfer from the closed position into the open position or vice versa.

In this case, an elastic deformation of the valve member is merely necessary for the purpose of being able to achieve a sealed closure of the valve member with the valve seat in the closed position.

Such movability of the valve member between the closed position and the open position may preferably be brought about in that the valve member is guided for movement between the closed position and the open position in order to avoid any faulty functioning of the check valve, in particular any unreliable closing thereof.

Such faulty functioning of the check valve occurs, in particular, when the valve member tilts during its movement between the closed position and the open position or vice versa and can, therefore, no longer move in the desired manner.

For this reason, one advantageous solution provides for the valve member to be guided between the closed position and the open position essentially free from any canting so that a reliable functioning of the valve member can be ensured.

Such canting-free guidance of the valve member between the open position and the closed position can be realized in the most varied of ways.

Such canting-free guidance of the valve member may be achieved particularly advantageously when this canting-free guidance is brought about by guidance within the insert part, i.e. in the case of an insert part designed in two parts, or by a relative movement of the insert part in the insert part receptacle so that the guidance for the movability of the valve member results between the insert part and the receptacle.

Another advantageous embodiment provides for the holding attachment of the valve member to be guided for movement in the insert part and, as a result, guidance of the valve element and, in particular, of the valve member can be realized.

With respect to the accommodation of the valve element in the insert part, no further details have so far been given.

The reduction in wear on the valve element may be realized, in particular, in that the insert part accommodates the valve element with burr-free surfaces.

In addition, it is particularly favorable when the insert part accommodates the valve element with machined surfaces, wherein machined surfaces are to be understood such that they have a surface roughness acting on the elastomeric material of the valve element free from wear.

Furthermore, it is preferably provided for the insert part to abut on the valve element with surfaces merging into one another with radii>0.2 millimeters.

The surfaces abutting on the valve element may be realized particularly advantageously when the insert part is formed from a plastic material free of reinforcing fibers.

The insert part may be expediently realized from the plastic material which represents the matrix material of the valve housing.

One particularly favorable solution provides for the insert part to have a ring member for accommodating the valve element since such a ring member is in a position to accommodate the valve element in a particularly careful manner with especially little wear.

Furthermore, it is advantageous when the ring member has a rounded ring inner side, with which it abuts on the valve element.

Alternatively thereto, one advantageous solution provides for the insert part to have a holding sleeve.

It is expediently provided in the case of such a holding sleeve for this to abut on the valve element with a rounded supporting bead.

With respect to the design of the insert part receptacle for accommodating the insert part, the most varied of solutions are conceivable.

One advantageous solution provides for the insert part receptacle to accommodate the insert part at least partially.

With this solution it is provided, for example, for the valve element to be arranged outside the insert part receptacle.

Another advantageous solution provides for the insert part receptacle to accommodate the insert part completely.

Irrespective of whether the insert part receptacle accommodates the insert part partially or completely, the arrangement of the valve element can be optional.

Even when the insert part receptacle accommodates the insert part completely, it is possible, in particular, to arrange the valve element outside the insert part receptacle.

One particularly favorable solution provides for the insert part receptacle to accommodate the valve element.

Such a solution has the advantage that, as a result, the valve element can be secured in addition by the insert part receptacle even in the case of partial wear and tear or loosening of parts.

In this respect, a solution, with which the valve element is arranged in a space formed between the insert part and the insert part receptacle, is particularly advantageous.

In this case, it is possible to secure the valve element in place, in particular the valve member thereof, even if the valve element were to loosen from the holding attachment as a result of wear and tear since the valve element can still be held in the space formed between the insert part and the insert part receptacle.

With respect to the design of the valve seat, no further details have so far been given.

It would be conceivable, for example, to provide a separate element, which can be fixed in place on the valve housing, for the formation of the valve seat, as well.

However, a solution, with which the valve seat is formed on the valve housing, is particularly inexpensive.

A solution which is likewise advantageous and inexpensive provides for the valve seat to be formed on the insert part.

In this case, it is likewise possible to produce the valve seat with a surface quality which allows the valve element, in particular the valve member, to abut on the valve seat free of wear and tear.

It is, in particular, possible to produce the valve seat burr-free and with a preferred surface quality either by way of machining or by way of other measures.

In this respect, it proves to be a particular advantage when the insert part is produced from a plastic material free of reinforcing fibers since such a material is easy to machine and can, therefore, be produced with a high surface quality.

In order to give the valve housing and also, in particular, the oil separator housing the necessary stability and resistance to fatigue, it is preferably provided for the oil separator housing and/or the valve housing to be formed from a fiber-reinforced plastic material since this increases the mechanical strength and the temperature stability.

Such a fiber-reinforced plastic material may not be machined with a high surface quality. This is, however, irrelevant in the case where an insert part is used since the surface quality is not critical in the case of the interaction between the insert part and the insert part receptacle.

Additional features and advantages of the invention are the subject matter of the following description as well as the drawings illustrating several embodiments.

DETAILED DESCRIPTION OF THE INVENTION

Figure 1:
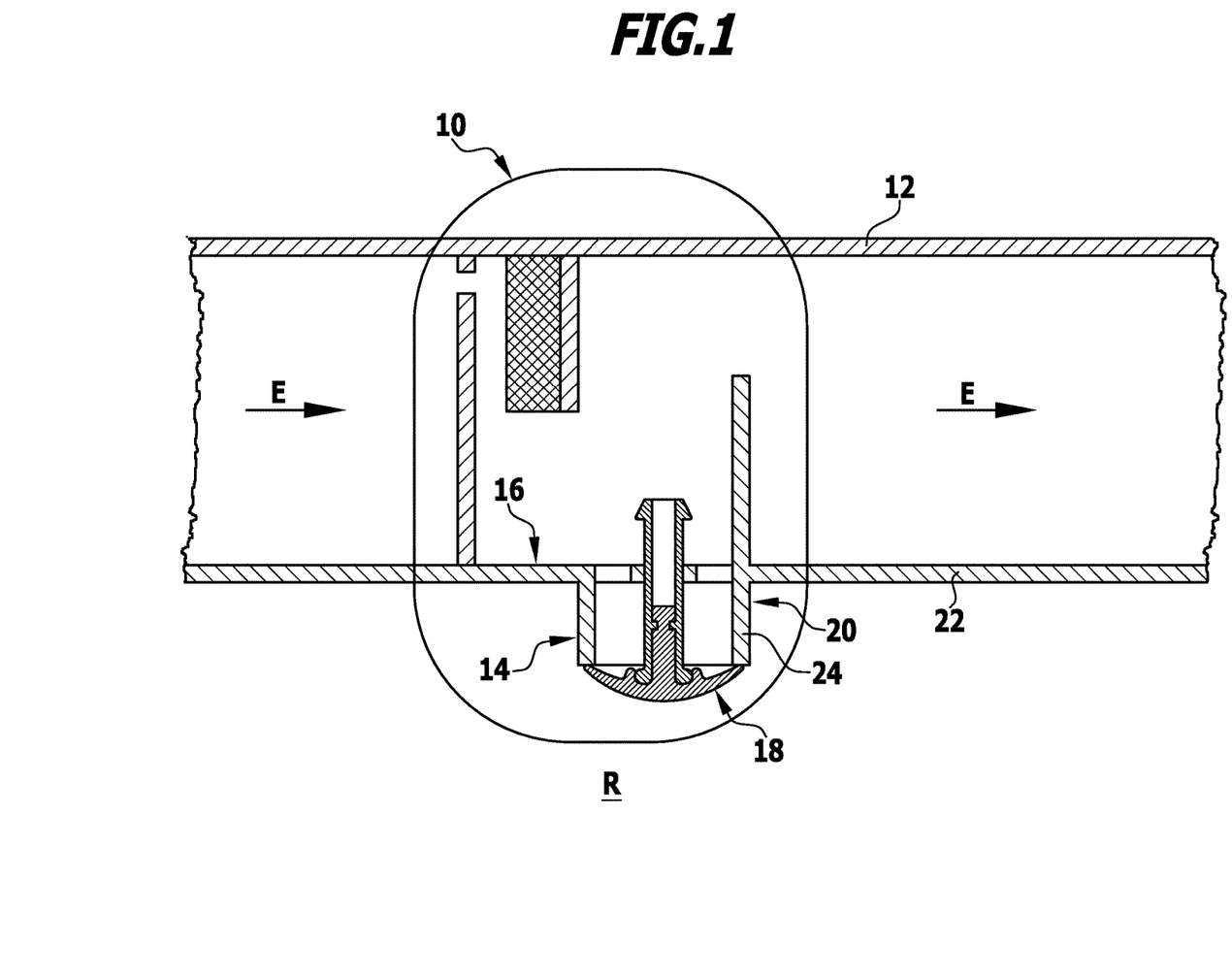
FIG. 1 shows an overall illustration of an oil separator unit according to the invention as part of a vehicle engine.

An oil separator unit, which is illustrated in FIG. 1, designated as a whole as 10 and integrated, for example, into a crankcase section or a camshaft chamber cover of a combustion engine, comprises an oil separator housing 12 which has a ventilating gas E flowing through it and is provided with a drainage system 14 which comprises an oil collecting device 16 and a check valve unit 18 which is associated therewith and has a valve housing 20 which serves the purpose of discharging oil from the oil collecting device 16 into a chamber R, for example into a crankcase or a camshaft chamber, but preventing any flow back of oil or gas from the chamber R into the oil collecting device 16.

Figure 2:
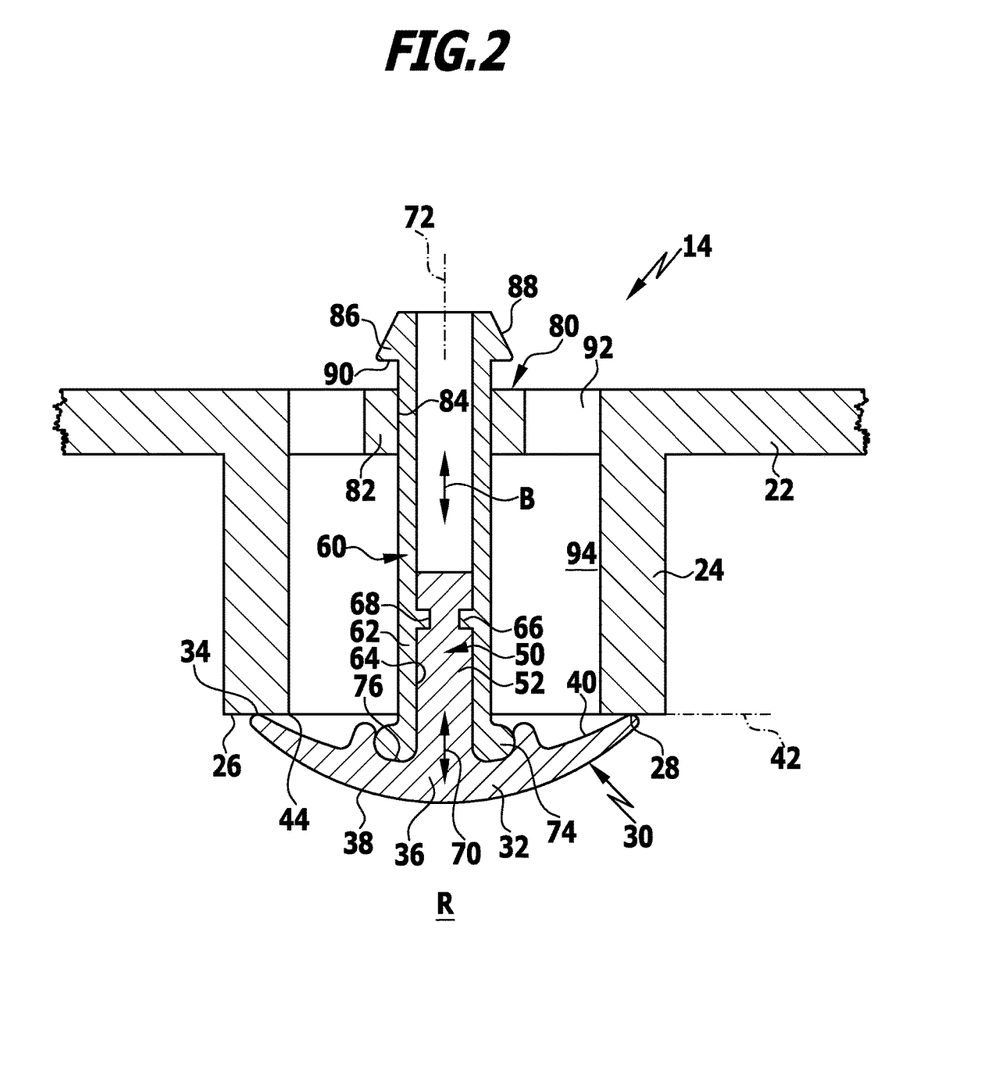
FIG. 2 shows a section through a first embodiment of a drainage system according to the invention with a check valve unit.

A first embodiment of such a drainage system 14 according to the invention, illustrated in FIG. 2, comprises a valve support 24 which is integrally formed on a base 22 of the oil collecting device 16 and is designed, for example, as a sleeve which adjoins the base 22 and on its end side 26 facing away from the base 22 forms a valve seat 28, on which a valve element designated as a whole as 30 and comprising a valve member 32 of an umbrella-like design can abut with an outer umbrella edge 34.

The valve member 32 serves the purpose of closing an opening 44 in the base 22 which is surrounded by the valve seat 28, wherein the valve seat 28 is arranged on the valve seat support 24 and, therefore, on the base 22 on a side facing the valve member 32 and extending around the opening 44.

The umbrella-like valve member 32 extends from a central area 36 in a curved manner as far as the outer umbrella edge 34, wherein the valve member 32 has an outer side 38 which is curved convexly and is located so as to face away from the valve seat 28 as well as an inner side 40 which is curved concavely.

In a closed position of the check valve unit 18, the umbrella edge 34 abuts on the valve seat 28 and thereby extends in a plane 42, in which the valve seat 28 is also located, wherein for the abutment of the umbrella edge 34 on the valve seat 28 acted upon by a force the valve member 32 can be elastically pretensioned between the central area 36 and the umbrella edge 34.

A holding attachment 50 is integrally formed on the central area 36 of the valve member 32 in one piece and rises above the concavely curved inner side 40 and beyond the umbrella edge 34 and engages with a holding pin 52 in an insert part 60 which has, for example, a holding sleeve 62, into the interior space 64 of which the holding pin 52 extends and is fixed in it in a form locking manner, for example by means of a collar 66 of the holding sleeve 62 which protrudes into the interior space 64 and engages in a corresponding recess 68 in the holding pin 52 so that the holding pin 52 is fixed in a form locking manner in the holding sleeve 62 in the direction of its longitudinal extension 70, wherein the longitudinal direction 72 of the holding sleeve extends parallel to the longitudinal direction 70.

The holding sleeve 62 is provided, in addition, at its end facing the central area 36 with a circumferential supporting bead 74 with rounded surfaces which are machined free of burrs and on which the central area 36 abuts with a corresponding recess 76 and surrounds them at least partially.

The entire valve element 30, i.e. the valve member 32 and the holding attachment 50, are formed from an elastomeric material which is in a position, as a result of the holding sleeve 62 of the insert part 60 and the supporting bead 74, to carry out the deformation movements for the opening of the check valve unit 18, i.e. the deformation movements with which the umbrella edge 34 lifts away from the valve seat 28, durably and free of sharp-edged actions on the part of the supporting bead and, therefore, in a long-term stable manner.

The fixing of the insert part 60 of the check valve unit 18 in position is brought about by an insert part receptacle which is designated as a whole as 80 and has an insert part support element 82 with a passage 84, through which the holding sleeve 62 of the insert part 60 can be pushed so that locking noses 86 of the insert part, which are integrally formed on the holding sleeve 62, engage behind the insert part support element on a side located opposite the valve element 30 and, therefore, secure the insert part 60 against any release from the insert part support element 82.

In this respect, the holding sleeve 62 can preferably be deformed radially inwards with its end area supporting the locking noses 86 so that during the insertion of the insert part 60 into the insert part support element 82 the locking noses 86 abut on the passage 84 with inclined slide-in surfaces 88 and this presses the locking noses 86 radially inwards on account of the action of the inclined slide-in surfaces 88 so that they can be moved through the passage 84 and abut and are supported with their holding surfaces 90 on the insert part support element 82 around the passage 84.

In order to move the valve element 30 between the closed position illustrated in FIG. 2 and an open position, the insert part 60 can be moved relative to the insert part receptacle 80 in a guided manner, for example due to the fact that the holding sleeve 62 can be moved in its longitudinal direction relative to the insert part support element 82 to such an extent in the direction of movement B that the holding surfaces 90 do not abut on the insert part support element 82 until the insert part 60 has been moved with the valve element 30 to such an extent in the direction of the valve seat 28 that the umbrella edge 34 is at a distance from the valve seat 28 when the valve member 32 is not deformed and, therefore, the check valve unit 18 is in the open position.

The insert part support element 82 preferably comprises openings 92, through which oil collecting over the base 22 can enter the valve seat support 24 through the insert part support element 82 and flow in the direction of the valve member 32 which, with a sufficiently large amount of oil, therefore generates a sufficiently large static pressure which counteracts, for example, a difference in pressure between the pressure in the chamber and the pressure in the valve seat support when the engine is running which keeps the valve element 30 in the closed position and so the valve member 32 lifts away from the valve seat 28 with the umbrella edge 34 and transfers into the open position in order to allow the oil to exit from an interior space 94 of the valve seat support 24 following the direction of gravity into a chamber R which surrounds the valve member 32 on its convex outer side 38, wherein the chamber R can be, for example, a chamber of the crankcase or a camshaft chamber.

In the first embodiment, the base 22, the valve seat support 24 integrally formed thereon in one piece and the insert part receptacle 80 are, in particular, formed in one piece from a plastic material which is filled with fibers to increase the stability.

The problem with such a plastic material is to accommodate the valve element 30, which is produced from an elastomeric material, in a burr-free receptacle such that the valve element 30 can permanently function free from damage.

For this reason, the insert part 60 is provided which is preferably produced from a plastic material without any fiber filling, wherein the matrix material can, for example, be the same material as the matrix material of the base 22 of the oil collecting device 16 and also of the valve seat support 24 as well as the insert part receptacle 80.

The insert part 60 can be produced separately from the oil collecting device 16 as an additional part and be provided with surfaces for accommodating the holding attachment 50 which have a surface form necessary for the wear-free accommodation of elastomeric material and a high surface quality so that the holding attachment 50 and, therefore, also the valve element 30 do not experience any damage whatsoever caused by the surfaces of the insert part 60 during the course of their operation.

On the other hand, the insert part 60 is robust with respect to its fixing in position in the insert part receptacle 80 and so the insert part receptacle 80 can have the surface problems occurring in conjunction with a fiber-filled plastic material which do not have a negative affect on the connection between the insert part receptacle 80 and the insert part 60.

Figure 3:
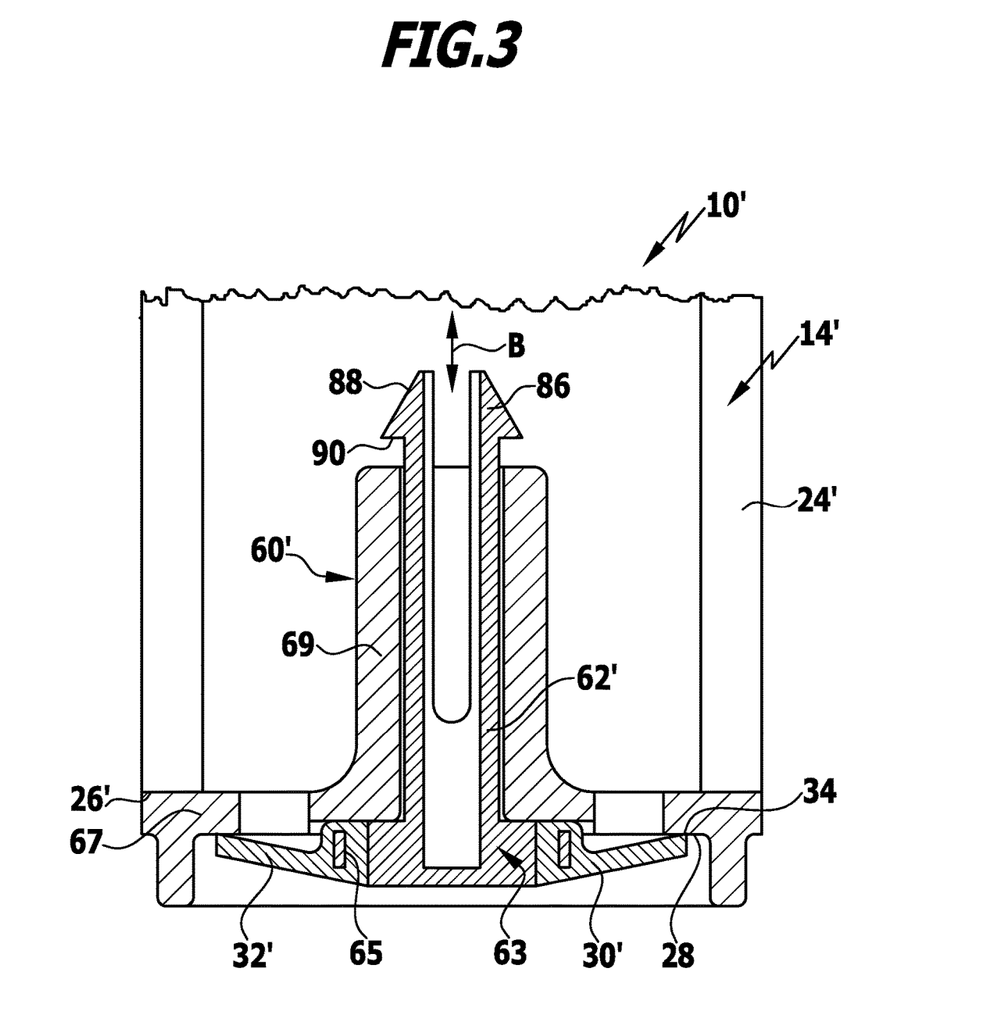
FIG. 3 shows a section similar to FIG. 2 through a second embodiment of an oil separator unit according to the invention with a check valve unit.

In a second embodiment of an oil separator unit 10' according to the invention with a drainage system 14', illustrated in FIG. 3, the insert part 60' is designed in two parts, namely, on the one hand, as a holding sleeve 62' which forms a base member 63 for the valve element 30' which is integrally formed on the base member 63, for example is sprayed onto it, and penetrates passages 65 provided in the base member 63 so that the valve member 32' of the valve element is connected to the base member 63 in a mechanically fixed manner and, as for the rest, is also terminated with it so as to be sealed against any media.

As for the rest, the valve member 32' likewise extends like an umbrella as far as the umbrella edge 34 which can abut on the valve seat 28 in the closed position.

In contrast to the first embodiment, the valve seat 28 is arranged on a flange member 67 of the insert part 60 which is securely connected, for its part, to a guide sleeve 69 for the holding sleeve 62' so that the holding sleeve 62' can be moved in the guide sleeve 69 in a direction of movement B in a limited manner in order to move the valve member 32' from the closed position illustrated in FIG. 3 into the open position which is determined by holding surfaces 90 of the locking noses 86 which abut on the guide sleeve 69 in the open position.

The guide sleeve 69 forms a canting-free longitudinal guide for the holding sleeve 62' in the direction of movement B, by means of which the valve member 32' can be moved between the closed position and the open position in a secure and interruption-free manner.

The flange member 67 preferably abuts on the end side 26' of the valve seat support 24' and terminates sealingly with it which can be realized, for example, by way of a materially locking connection.

With the second embodiment, as well, the advantage is to be seen in the fact that the insert part 60' including the holding sleeve 62' and the flange member 67 with the guide member 69 is a component which can be produced separately and fixed in place on the valve housing 20 and with which the connection of the valve member 32' to the base member 63 of the holding sleeve 62' can be formed in a wear-free manner and, as for the rest, movability of the holding sleeve 62' relative to the guide sleeve 69 can be ensured in a wear-free manner and so the service life of the valve member 32' produced from the elastomeric material is not limited by surface defects of the material of the valve housing 20.

Figure 4:
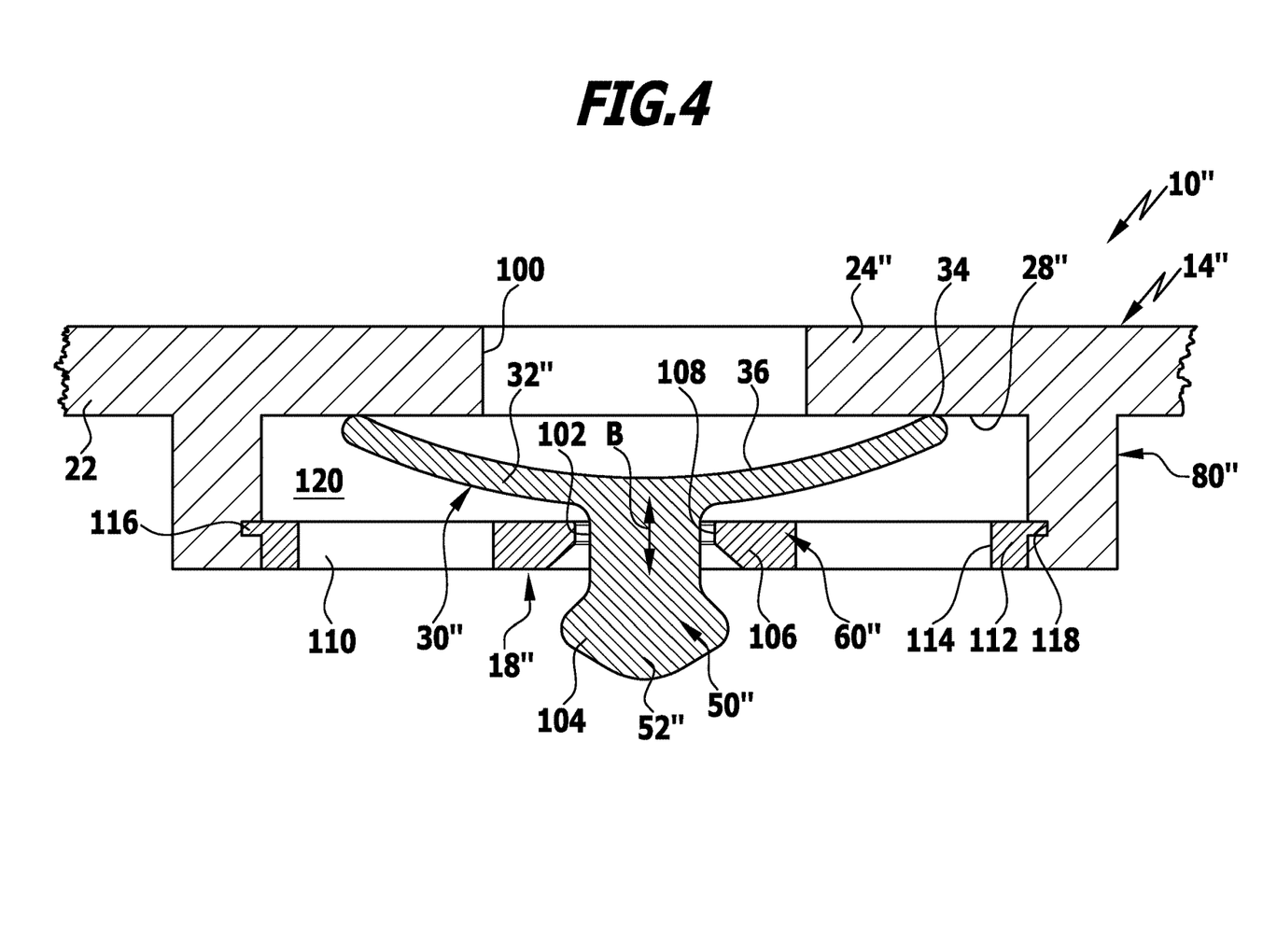
FIG. 4 shows a section similar to FIG. 2 through a third embodiment of an oil separator unit according to the invention with a check valve unit.

In a third embodiment of an oil separator unit 10" according to the invention with a drainage system 14", illustrated in FIG. 4, the valve seat support 24", which forms on one side the valve seat 28' which is arranged facing the valve element 30", is likewise integrally formed on the base 22.

The valve element 30" likewise comprises a valve member 32" which is of an umbrella-like design and abuts with its umbrella edge 34 on the valve seat 28" in the closed state of the check valve unit 18".

The holding attachment 50" is integrally formed on the central area 36 of the valve member 32", namely in this case on a side facing away from the valve seat 28". The holding attachment 50" has a narrowed area 102 which adjoins the valve member 32" and a thickened area 104 which follows on from the narrowed area 102 and is located opposite the valve member 32", these two areas together forming the holding pin 52".

In this embodiment, as well, the holding pin 52" and the valve member 32" are connected to one another in one piece and produced from an elastomeric material.

The valve element 30" is fixed in place by an insert part 60" which is arranged on a side of the valve member 32" located opposite the valve seat 28" and keeps the valve element 30 fixed in position with a ring member 106 which engages in the narrowed area 102, wherein the ring member 106 abuts on the holding pin 52" in the region of the narrowed area 102 with a rounded ring inner side 108, which has the required surface quality, and, therefore, keeps it limitedly movable in the direction of movement B prior to assembly of the insert part 60".

The ring member 106 of the insert part 60" is connected to an outer holding ring 112 via arms 110 so that openings 114 result between the arms 110, through which oil can pass through the insert part 60".

The insert part 60" has on the outer holding ring 112 projections 116 which engage in recesses 118 of the insert part receptacle 80", wherein in this case the insert part receptacle 80" is integrally formed on the base 22 in one piece and is designed as a sleeve which rises above the valve seat 28" and in the interior space 120 of which the valve member 32" and the insert part 60" can be arranged, wherein the valve member 32" is located in this embodiment between the valve seat 28" and the insert part 60". The movability of the valve member 32" between the closed position, illustrated in FIG. 4, and the open position in the direction of movement B is predetermined by the distance of the insert part 60" from the valve seat 28" which is selected such that the valve member can be brought from the closed position, in which the umbrella edge 34 abuts on the valve seat 28", into the open position, in which the valve member 32" abuts on the insert part 60" with the outer side 38.

As a result, the valve member 32" is secured by the insert part 60", in addition, against any detachment from the holding attachment 50" so that even in the case of any detachment from the holding attachment 50" the valve member 32" does not have the possibility of moving through the openings 114.

On the contrary, the valve member 32 will be held in the interior space 20 between the valve seat 28" and the insert part 60" even in the case of any detachment of partial sections from the holding attachment 50.

As a result, an additional securement for the valve member 32" against any disconnection and being carried along with the oil is provided in this embodiment of the drainage system 14" according to the invention.

In this embodiment, as well, the surfaces of the ring member 106, in particular the ring inner sides 108, may be produced with the surface form and the high surface quality required for the wear-free accommodation of elastomer since the insert part 60" can be produced separately from the base 22 and the insert part receptacle 80" while the surfaces for accommodating the insert part 60" can also be produced with an inferior surface quality.

As for the rest, those elements of the second embodiment which are identical to those of the first embodiment are given the same reference numerals and so with respect to the description thereof reference can be made in full to the comments on the first embodiment.

Figure 5:
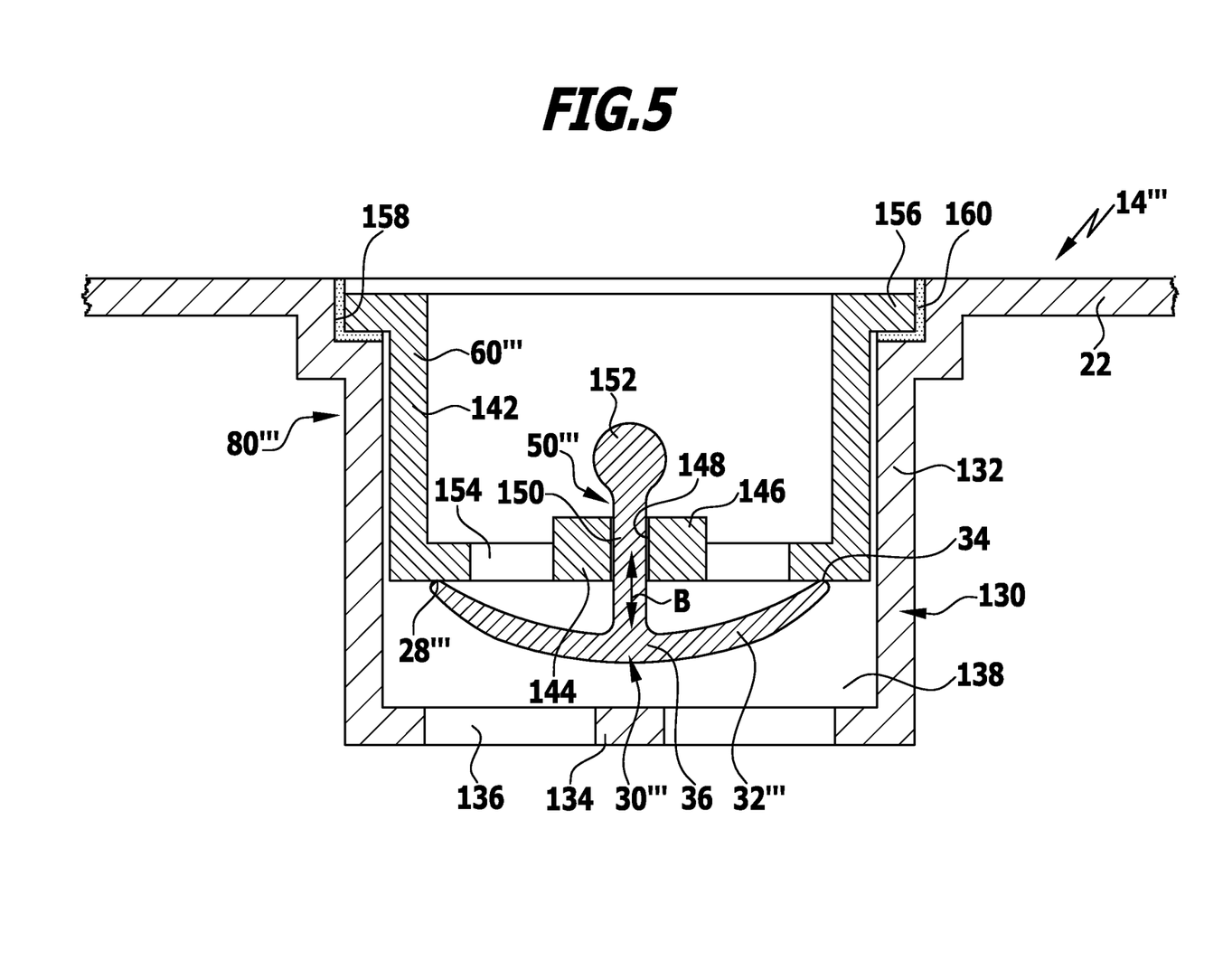
FIG. 5 shows a section similar to FIG. 2 of a fourth embodiment of an oil separator unit according to the invention with a check valve unit.

In a fourth embodiment, illustrated in FIG. 5, the base 22 is provided with a pot-like recess 130 which has side walls 132 integrally formed on the base 22 in one piece and a base 134, wherein the base 134 is provided with openings 136 for oil which collects in the pot-like recess 130.

The valve element 30''' is inserted into an interior space 138 of the recess 130 and is held by an insert part 60''' likewise inserted into the interior space 138.

The insert part 60''' is, in this embodiment, also of a pot-like design and likewise comprises side walls 142 as well as a base 144 which forms, for its part, a ring member 146 which abuts on the holding attachment 50''' of the valve element 30''' with a ring inner side 148, wherein the holding attachment 50''' extends at least partially through the ring member 146 with a neck 150 and the neck 150 has on its side located opposite the valve member 32''' a thickened area 152 which secures the holding attachment 50''' against any movement through the ring member 146 in the direction of movement B and, in particular, against any movement of the holding attachment 50''' in the direction of the side of the base 14, on which the valve member 32 is arranged.

Moreover, the ring inner side 148 has, in the direction of movement B, an adequately large guiding length in order to guide the neck 150 and, therefore, also the valve member 32" during its movements in the direction of movement B in a canting-free manner and, therefore, ensure a reliable functioning of the valve.

As a result, the valve member 32 of this embodiment is also located between the base 144 of the insert part 60''' and the base 134 of the recess 130 and is, therefore, secured even during any detachment from the holding attachment 50'''.

In order to allow oil to pass through the base 144, this is provided with openings 154 which are arranged around the ring member 146 and located within the valve seat 28''' which is formed on a side of the base 144 facing the base 134 and extends around the openings 154 so that the valve member 32''' is in a position to prevent any flow of oil through the openings 154 in the closed position with an umbrella edge 34 abutting on the valve seat 28''', but, proceeding from this position, to move into the open position, in which the valve member 32''' abuts on the base 134 and releases the flow of oil.

The insert part 60''' is fixed in position in the insert part receptacle 80" designed as recess 130, for example, by way of adhesion of flange sections 156 in flange receptacles 158, which accommodate the flange sections 156 and are integrally formed on the base 22, by means of an adhesive layer 160. As a result, the insert part 60''' is located in the insert part receptacle 80''' in a sealed manner relative to the base 22 and the oil collecting over the base 22 enters the insert part 60''' and passes through the openings 154 in the base 144 thereof when the valve member 32''' is open so that the oil can then flow past the valve member 32''' and can exit from the insert part receptacle 80''' again through the openings 136 in the base 134.

Figure 6:
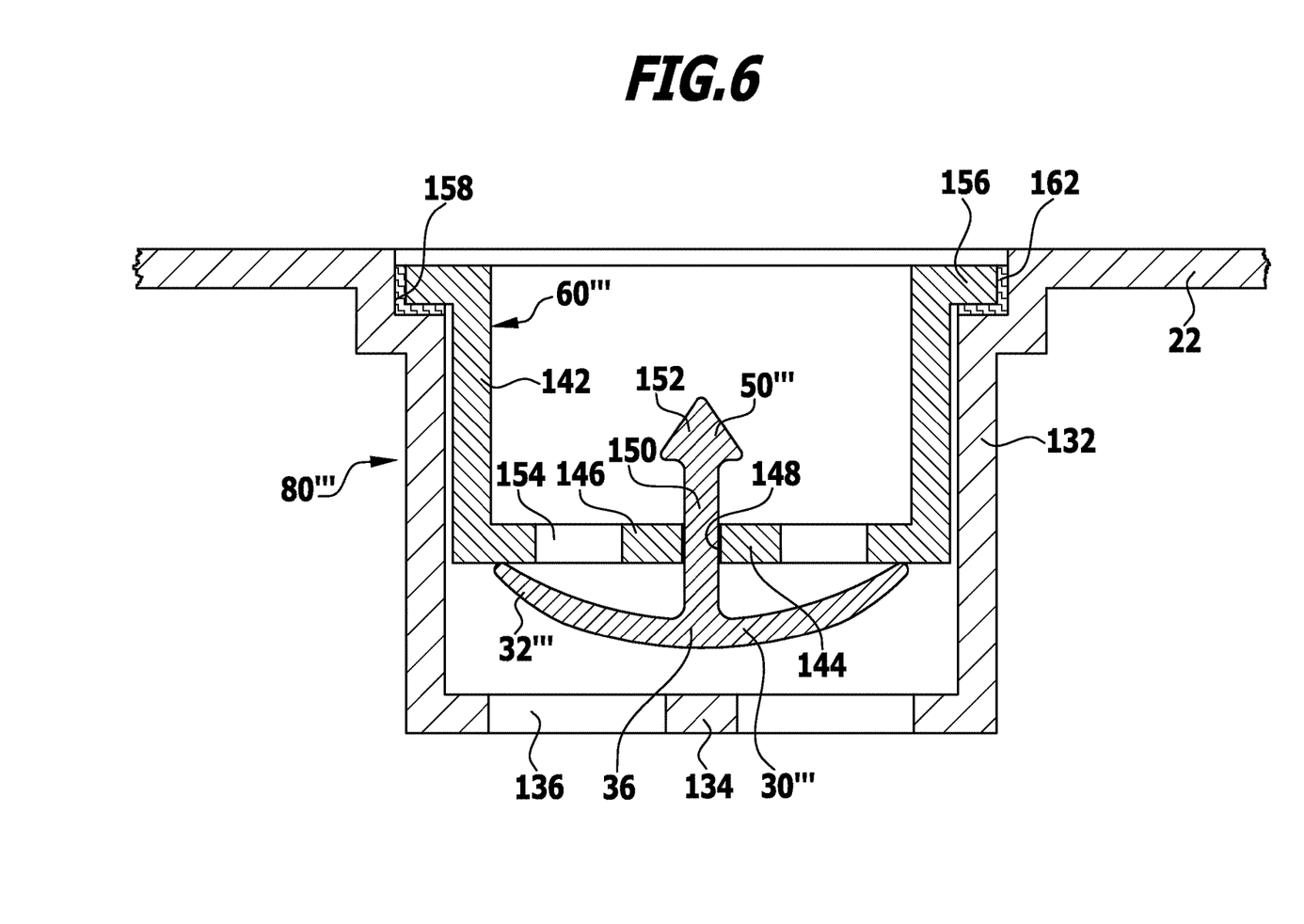
FIG. 6 shows a section similar to FIG. 2 through a fifth embodiment of an oil separator unit according to the invention with a check valve unit.

A fifth embodiment, illustrated in FIG. 6, is designed in the same way as the fourth embodiment, with the single difference that the insert part 60''' is not fixed in position in the insert part receptacle 80''' by way of adhesion of the flange sections 156 to the flange receptacles 158 but rather by way of welding thereof and so a weld seam 162 is formed which represents a sealed closure between the flange section 156 and the flange receptacle 158.

As for the rest, those parts which are identical to the corresponding parts of the fourth embodiment are given the same reference numerals and so reference can be made in full to the comments on the third embodiment with respect to the description thereof.

Figure 7:
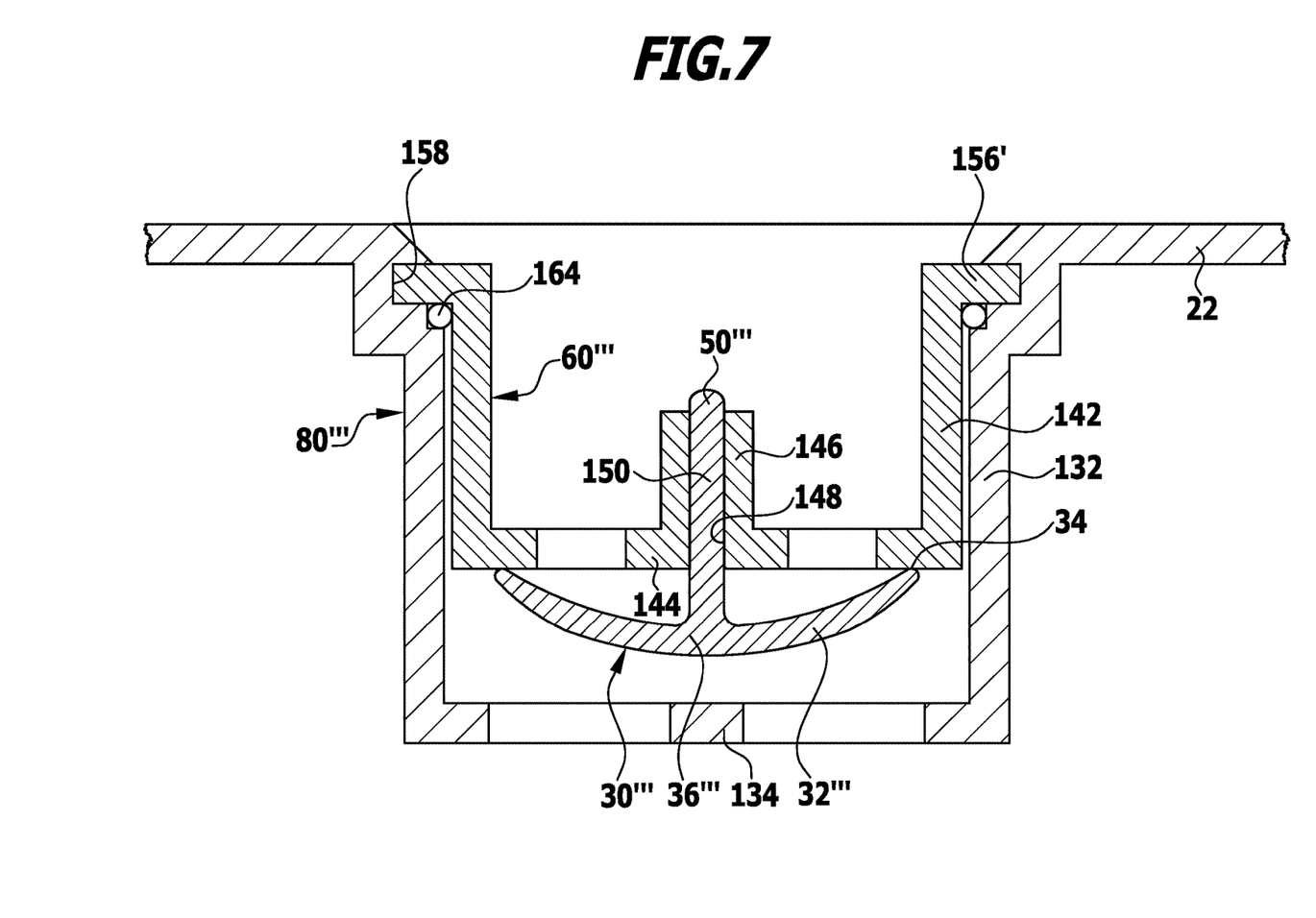
FIG. 7 shows a section similar to FIG. 2 through a sixth embodiment of an oil separator unit according to the invention with a check valve unit and FIG. 8 shows a section similar to FIG. 2 through a seventh embodiment of an oil separator unit according to the invention with a check valve unit.

In a sixth embodiment, illustrated in FIG. 7, the insert part 60''' and the insert part receptacle 80''' are designed in a similar way to the fourth and fifth embodiments.

One difference to the fourth and fifth embodiments consists in the fact that the flange sections 156' engage in circumferential, ring-shaped recesses of the insert part receptacle 80''', designed as flange receptacle 158', and, therefore, can be locked in the insert part receptacle 80''' in a form locking manner.

In order to be able to reliably provide a sealed closure in the insert part 60''' and the insert part receptacle 80''', a sealing ring 164 is provided in the region of the flange receptacle 158' and this brings about a sealed closure between the side walls 132 of the insert part receptacle 80''' and the side walls 142 of the insert part 60''' when the flange sections 156' are locked into the flange receptacle 158'.

Moreover, the holding attachment 50′′′ of the sixth embodiment is provided only with the neck 150 which is guided through the ring inner side 148 of the ring member 146 in a canting-free manner, wherein the thickened area 152 serving as securement against loss is missing.

The securement against loss for the valve element 30′′′ is brought about by the base 134 of the insert part receptacle 80′′′.

As for the rest, those parts of the sixth embodiment which are identical to those of the fourth and fifth embodiments are given the same reference numerals and so with respect to their description reference can be made in full to the third and fourth embodiments as well as the remaining, preceding embodiments.

Figure 8:
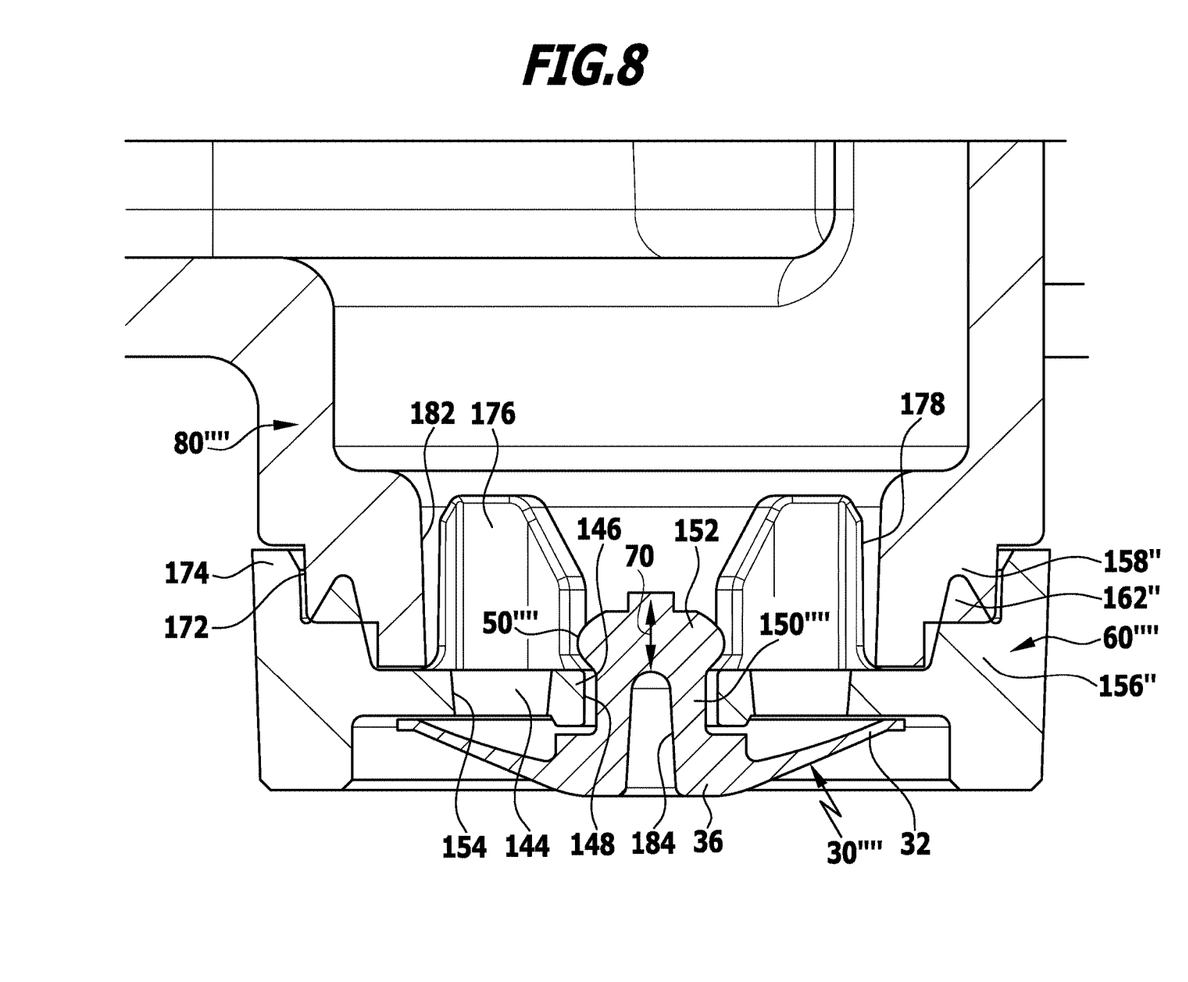

In a seventh embodiment, illustrated in FIG. 8, the insert part 60′′′′ is provided with an outer flange section 156″ which is connected to a flange receptacle 158″ of the insert part receptacle 80′′′′ by friction welding, wherein during the friction welding a friction welding area 162″ is formed which brings about a fluid-tight, in particular oil-tight connection between the flange section 156″ and the flange receptacle 158″.

In this respect, the flange receptacle 158″ is provided, for example, with a circumferential groove 172, in which a ring-shaped projection 174 of the flange section 156″ engages.

In order to achieve an advantageous centering of the insert part 60′′′′ when the flange section 156″ is placed on the flange receptacle 158″, the insert part 60′′′′ is preferably provided with ribs 176 which rise from the base 144 of the insert part 60′′′′ and engage in the flange receptacle 158″, wherein the ribs 176 have, for example, outer edges 178 which can be supported on an inner contour 182 of the flange receptacle 158″ for the purpose of centering the insert part 60′′′′.

The ribs 176 are preferably arranged between the openings 154 on the base 144 and extend as far as the ring member 146 which forms the ring inner side 148 for accommodating the neck 150′′′′ of the valve element 30′′′′.

In the same way as in the second to sixth embodiments, the neck 150′′′′ preferably has the thickened area 152 for supporting the same on the ring member 146.

In addition, the neck 150′′′′ is provided with a cavity 184 which extends into the neck 150′′′′ from a side within the central area 36 of the valve member 32 facing away from the base 144 and serves the purpose of accommodating an assembly pin for the assembly of the valve element 30′′′′.

As for the rest, the valve element 30′′′′ is movable in direction 70 in the same way as that explained in conjunction with the preceding embodiments.

As for the rest, those parts of the seventh embodiment which are identical to the parts of the preceding embodiments are given the same reference numerals and so reference can be made in full to the preceding embodiments with respect to the shape and the interaction of these parts with one another as well as the overall functioning of the check valve unit 18.

It is, therefore, also possible with the fourth, fifth, sixth and seventh embodiments to produce the insert part 60′′′, 60′′′′ as a separate part with a suitable surface form and high surface quality, in particular in the region of the ring member 146 holding the holding attachment 50′′′, 50′′′′ and the ring inner side 148 so that damage to the holding attachment 50′′′, 50′′′′ of the valve element 30′′′, 30′′′′ will be avoided and, therefore, a reliable continuous operability of the valve element 30′′′, 30′′′′ is provided.

The invention claimed is:

1. An oil separator unit provided for vehicle drives, comprising an oil separator housing with an oil collecting device, a drainage system and a check valve unit comprising a valve housing, a valve seat and a valve element, said valve element comprising a valve member of an umbrella-shaped design, having a stem connected thereto, and consisting of an elastomer, the valve member of the valve element is connected to an insert part by the stem extending through and guided by an opening in the insert part, the valve element and stem are movable as a whole, relative to the insert part and the valve seat, between a closed position and an open position, and wherein the insert part is, for its part, inserted into an insert part receptacle provided in the valve housing.

2. Oil separator unit as defined in claim 1, wherein the insert part receptacle is integrally formed on the valve housing in one piece.

3. Oil separator unit as defined in claim 1, wherein the insert part is designed as a one-piece part.

4. Oil separator unit as defined in claim 1, wherein the insert part is held in the insert part receptacle in a form locking manner.

5. Oil separator unit as defined in claim 4, wherein the insert part is lockable in the insert part receptacle.

6. Oil separator unit as defined in claim 1, wherein the insert part is fixed in place in the insert part receptacle in a materially locking manner.

7. Oil separator unit as defined in claim 6, wherein the insert part is glued to the insert part receptacle.

8. Oil separator unit as defined in claim 6, wherein the insert part is welded to the insert part receptacle.

9. Oil separator unit as defined in claim 1, wherein the insert part has at least one opening for oil.

10. Oil separator unit as defined in claim 1, wherein the valve member is held directly on the insert part.

11. Oil separator unit as defined in claim 10, wherein the valve member is connected securely to the insert part.

12. Oil separator unit as defined in claim 1, wherein the valve member is provided with a holding attachment of the valve element, said holding attachment comprising the stem.

13. Oil separator unit as defined in claim 12, wherein the holding attachment is integrally formed on the valve member in one piece.

14. Oil separator unit as defined in claim 1, wherein the valve member is guided for movement between the closed position and the open position.

15. Oil separator unit as defined in claim 14, wherein the valve member is guided without any canting.

16. Oil separator unit as defined in claim 1, wherein the insert part accommodates the valve element with burr-free surfaces.

17. Oil separator unit as defined in claim 1, wherein the insert part accommodates the valve element with machined surfaces.

18. Oil separator unit as defined in claim 1, wherein the insert part abuts on the valve element with surfaces merging into one another with radii >0.2 millimeters.

19. Oil separator unit as defined in claim 1, wherein the insert part is formed from a plastic material free of reinforcing fibers.

20. Oil separator unit as defined in claim 1, wherein the insert part has a ring member for accommodating the valve element.

21. Oil separator unit as defined in claim 20, wherein the ring member has a rounded ring inner side.

22. Oil separator unit as defined in claim 1, wherein the insert part has a holding sleeve.

23. Oil separator unit as defined in claim 22, wherein the holding sleeve abuts on the valve element with a rounded supporting bead.

24. Oil separator unit as defined in claim 1, wherein the insert part receptacle accommodates the insert part at least partially.

25. Oil separator unit as defined in claim 1, wherein the insert part receptacle accommodates the insert part completely.

26. Oil separator unit as defined in claim 1, wherein the valve element is arranged outside the insert part receptacle.

27. Oil separator unit as defined in claim 1, wherein the insert part receptacle accommodates the valve element.

28. Oil separator unit as defined in claim 1, wherein the valve element is arranged in a space formed between the insert part and the insert part receptacle.

29. Oil separator unit as defined in claim 1, wherein the valve seat is formed on the valve housing.

30. Oil separator unit as defined in claim 1, wherein the valve seat is formed on the insert part.

31. Oil separator unit as defined in claim 1, wherein the oil separator housing and/or the valve housing is formed from a fiber-reinforced plastic material.

32. Oil separator unit as defined in claim 1, wherein the insert part is made from a different material than the insert part receptacle in the valve housing.

33. Oil separator unit as defined in claim 32, wherein the insert part is made from a plastic material free of reinforcing fibers, and the insert part receptacle in the valve housing is made from a plastic material with reinforcing fibers.

34. Oil separator unit as defined in claim 1, wherein the insert part is tubular.

35. Oil separator unit as defined in claim 34, wherein the insert part is disposed within an opening in the insert part receptacle.

36. Oil separator unit as defined in claim 34, wherein the insert part completely encloses more than half of the length of the valve stem.

37. Oil separator unit as defined in claim 1, wherein the valve seat is formed from a portion of the valve housing.

* * * * *